(12) United States Patent
Bhagath

(10) Patent No.: US 9,073,126 B2
(45) Date of Patent: Jul. 7, 2015

(54) DOUBLE-SIDED CUTTING INSERT

(75) Inventor: Kedar Bhagath, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 315 days.

(21) Appl. No.: 13/878,871

(22) PCT Filed: Nov. 14, 2011

(86) PCT No.: PCT/KR2011/008676
§ 371 (c)(1),
(2), (4) Date: Apr. 11, 2013

(87) PCT Pub. No.: WO2012/067392
PCT Pub. Date: May 24, 2012

(65) Prior Publication Data
US 2013/0195566 A1    Aug. 1, 2013

(30) Foreign Application Priority Data

Nov. 15, 2010 (KR) .................... 10-2010-0113416

(51) Int. Cl.
*B23C 5/20* (2006.01)
*B23B 27/14* (2006.01)
*B23C 5/02* (2006.01)

(52) U.S. Cl.
CPC ......... *B23B 27/145* (2013.01); *Y10T 407/1906* (2015.01); *Y10T 407/23* (2015.01); *B23C 5/207* (2013.01); *B23C 2200/085* (2013.01); *B23C 2200/125* (2013.01); *B23C 2200/208* (2013.01); *B23C 2200/367* (2013.01); *B23C 5/02* (2013.01)

(58) Field of Classification Search
CPC ... Y10T 407/1924; Y10T 407/23; B23C 5/20; B23C 5/202; B23C 5/207; B23C 5/2213; B23C 5/2221; B23C 5/2247; B23C 5/2273; B23C 5/2282; B23C 2200/367

USPC ................................................... 407/42, 113
See application file for complete search history.

(56) References Cited

U.S. PATENT DOCUMENTS

| 5,597,271 A | 1/1997 | Men et al. |
| 6,109,838 A | 8/2000 | Riviére |
| 6,336,776 B1 | 1/2002 | Noggle |

(Continued)

OTHER PUBLICATIONS

Extended European Search Report dated Mar. 18, 2014 issued in European counterpart application (No. 11841886.2).

(Continued)

*Primary Examiner* — Sunil K Singh
*Assistant Examiner* — Alan Snyder
(74) *Attorney, Agent, or Firm* — Womble Carlyle

(57) ABSTRACT

A cutting insert is configured for shoulder milling cutting. The insert has a pair rectangular end surfaces which face away from each other, and pairs of first side surfaces and second side surfaces connecting the end surfaces. First cutting edges and second cutting edges in the first side surface are diagonally symmetrical with respect to a first imaginary median plane, which transverses the middles of both the first side surfaces. The first cutting edges and the second cutting edges in the second side surface are diagonally symmetrical with respect to a second imaginary median plane, which transverses the middles of both the second side surfaces. The second cutting edge is offset toward the first median plane from the first cutting edge. The first cutting edge is offset toward the second median plane from the second cutting edge.

12 Claims, 7 Drawing Sheets

(56) References Cited

U.S. PATENT DOCUMENTS

| | | |
|---|---|---|
| 7,094,007 B2 | 8/2006 | Satran et al. |
| 7,104,736 B2 | 9/2006 | Satran et al. |
| 7,494,303 B2 | 2/2009 | Koskinen |
| 8,282,320 B2 | 10/2012 | Hartlohner et al. |
| 2005/0042044 A1 | 2/2005 | Satran et al. |
| 2007/0183858 A1 | 8/2007 | Blomstedt |
| 2008/0232912 A1 | 9/2008 | Bhagath |
| 2009/0155004 A1 | 6/2009 | Jansson |
| 2010/0158620 A1 | 6/2010 | Spitzenberger et al. |

OTHER PUBLICATIONS

International Search Report dated May 17, 2012 issued in PCT counterpart application (No. PCT/KR2011/008676).

Written Opinion of the International Searching Autyority dated May 17, 2012 issued in PCT counterpart application (No. PCT/KR2011/008676).

Official Action dated Jul. 18, 2014 issued in Chinese counterpart application (No. 201180048340.6).

DOUBLE-SIDED CUTTING INSERT

RELATED APPLICATIONS

This is a 35 USC 371 U.S. National Phase of International Application No. PCT/KR2011/008676 filed 14 Nov. 2011 and published in English as WO 2012/067392A2 on 24 May 2012, which claims priority to KR 10-2010-0113416, filed 15 Nov. 2010. The contents of the aforementioned applications are incorporated by reference in their entirety.

TECHNICAL FIELD

The present invention generally relates to a cutting insert, which is more particularly beneficial for 90° shoulder milling cutting, which can cut a work-piece deeper than the length of the cutting insert and achieve 8 cutting corners.

BACKGROUND ART

Shoulder milling cutting means milling cutting where an insert angle of a cutting insert with respect to a work-piece is 90°. U.S. Pat. No. 7,604,441 discloses a conventional double-sided cutting insert for shoulder milling cutting. FIGS. 1-3 show the cutting insert (I) as disclosed in U.S. Pat. No. 7,604, 441.

As shown in FIGS. 1 and 2, the cutting insert (I) comprises two facing end surfaces (2) and four side surfaces (3), which connect the end surfaces. Both end surfaces (2) have an identical shape and a generally square shape when viewed from a vertical perspective. Also, the four side surfaces (3) have the identical shape as each other and are a diagonally-symmetrical structure with respect to a median plane (M). Each side of the end surface (2) comprises a cutting edge (4) and a wiper edge (5). That is, the cutting insert (I) has a total of eight cutting edges (4) and eight wiper edges (5). As shown in FIG. 2, each cutting edge (4) extends obliquely from a corner toward the median plane (M). Each wiper edge (5) upwardly extends from the end of the cutting edge (4) beyond the end surface (2).

The cutting insert (I) is configured to be mounted on an insert pocket of a milling cutter so as to have a negative axial relief angle and a negative radial relief angle since it is double-sided. The cutting edge (4) extends obliquely from the corner toward the medial plane (M). As such, at said mounting position, the cutting edge (4) is disposed in a positive axial rake angle with respect to a work-piece. Also, since the wiper edge (5) is higher than the end surface (2), a wiper clearance (WC), which is required in said mounting position, is secured. Thus, the cutting insert (I) can perform the 90° shoulder milling cutting.

FIG. 3 shows shoulder milling cutting of said cutting insert (I). The cutting insert (I) mounted on an insert pocket of a milling cutter has a problem since a non-operative wiper edge (5) protrudes in a radially outward direction of the milling cutter. Since the non-operative wiper edge (5) protrudes in a radially-outward direction of the milling cutter compared to the operative cutting edge (4), the cutting depth of the cutting insert (I) is limited to be a depth such that the protruding non-operative wiper edge (5) may not intervene with the work-piece.

SUMMARY

The present invention seeks to provide a solution to the above-described problem by providing a cutting insert, which comprises eight cutting edges performing shoulder cutting, and at the same time, can make a cutting depth that is deeper than the length of the cutting insert.

According to one embodiment of the present invention, a double-sided cutting insert for shoulder milling cutting comprises a pair of rectangular end surfaces that face each other, a pair of first side surfaces and a pair of second side surfaces, which connect the end surfaces and face each other. A first cutting edge and a second cutting edge are formed by the intersection of each first side surface and second side surface. The first cutting edges and the second cutting edges in the first side surface are diagonally symmetrical with respect to a first imaginary median plane, which transverses the middles of both the first side surfaces facing each other, and the first cutting edges and the second cutting edges in the second side surface are diagonally symmetrical with respect to a second imaginary median plane, which transverses the middles of both the second side surfaces facing each other. The second cutting edge is offset toward the first median plane from the first cutting edge and obliquely extends from a corner of the cutting insert toward the first median plane. The first cutting edge is offset toward the second median plane from the second cutting edge and obliquely extends from the corner of the cutting insert toward the second median plane.

In the double-sided cutting insert for shoulder milling cutting according to one embodiment of the present invention, a first wiper edge is formed by the intersection of the first side surface and the end surface such that the first cutting edge and the first wiper edge are disposed in a pair of facing corners of the first side surface. Further, a second wiper edge is formed by the intersection of the second side surface and the end surface such that the second cutting edge and the second wiper edge are disposed in a pair of facing corners of the second side surface.

According to the present invention, when viewed from the first side surface (30), the second cutting edge (200) is inwardly offset from the first cutting edge (100) toward the median plane (M1) by a gap (C1). As such, when the cutting insert (I) is radially mounted, the non-operative second cutting edge (200) is radially inwardly offset from the operative first cutting edge (100). Thus, the non-operative second cutting edge (200) does not protrude toward the radial direction of the milling cutter compared to the operative first cutting edge (100) and maintains a gap with the work-piece. Accordingly, when radially mounting the cutting insert (I), it can perform 90° shoulder milling at a cutting depth exceeding the cutting insert length.

When viewed from the second side surface (40), the first cutting edge (100) is inwardly offset from the second cutting edge (200) toward the median plane (M2) by a gap (C2). As such, when the cutting insert (I) is tangentially mounted, the non-operative first cutting edge (100) is radially inwardly offset from the operative second cutting edge (200). Thus, the non-operative first cutting edge (100) does not protrude toward the radial direction of the milling cutter compared to the operative second cutting edge (200) and maintains a gap with the work-piece. Accordingly, when tangentially mounting the cutting insert, it can perform 90° shoulder milling at a cutting depth exceeding the cutting insert length.

As such, the four first cutting edges (100) and four second cutting edges (200) formed at the cutting insert (I) can perform shoulder cutting at a cutting depth exceeding the cutting insert length.

DETAILED DESCRIPTION

Figure 1:
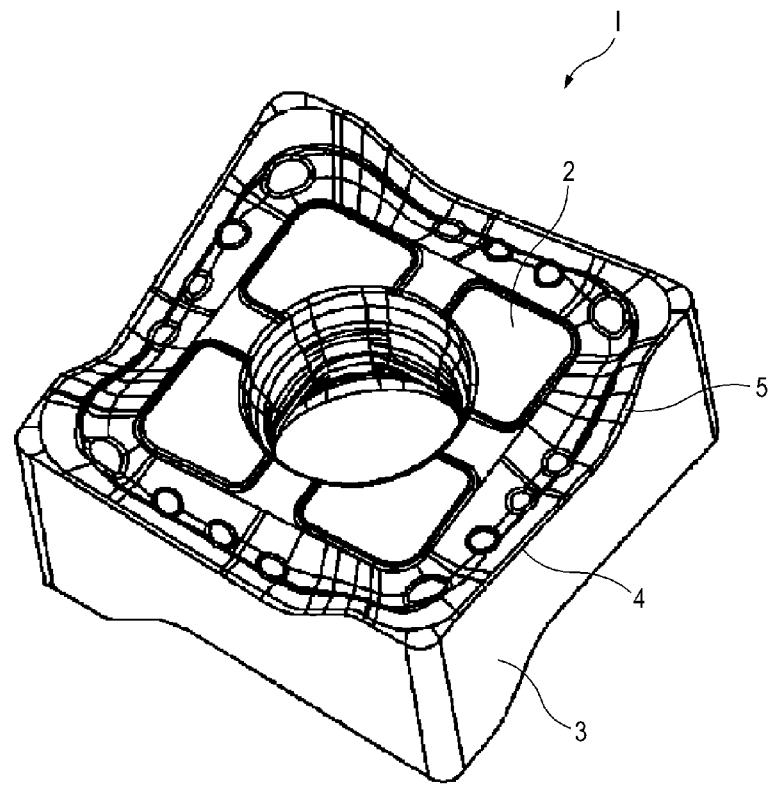
FIG. 1 illustrates a perspective view of a conventional double-sided cutting insert for shoulder milling cutting.
Figure 2:
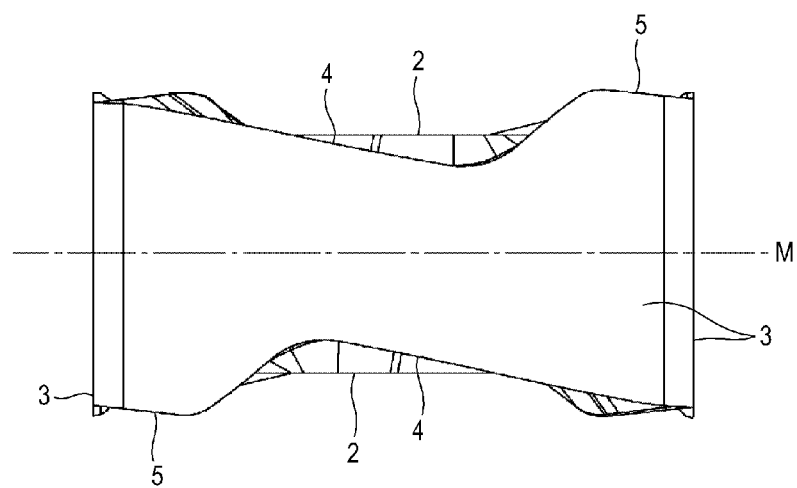
FIG. 2 illustrates a side view of a conventional double-sided cutting insert.
Figure 3:
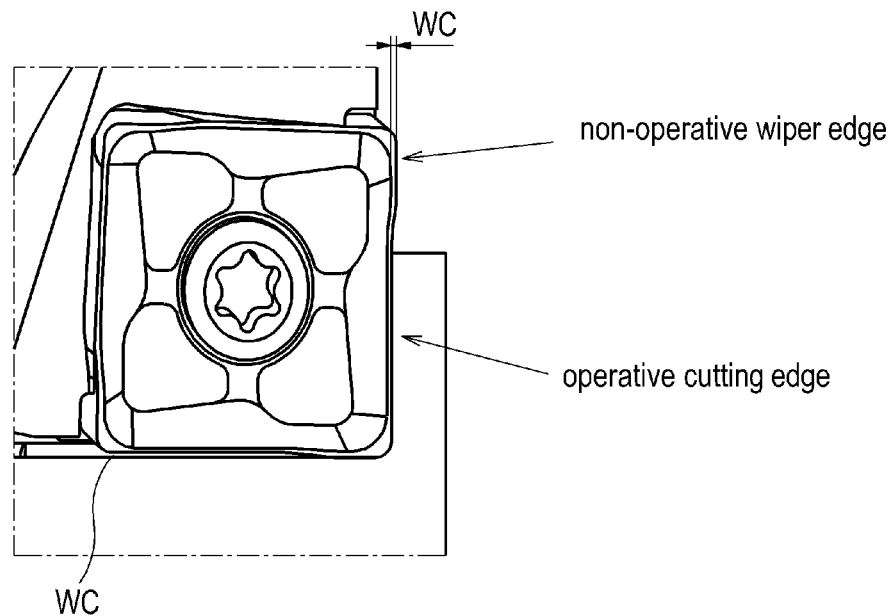
FIG. 3 illustrates the shoulder milling cutting of the double-sided cutting insert as shown in FIG. 2.

Hereunder, the double-sided cutting insert according to the present invention is described in detail.

Referring to FIGS. 4-7, the double-sided cutting insert (1) according to the present invention comprises: a pair of rectangular end surfaces (10) facing away from each other; and four side surfaces connecting the end surfaces (1), i.e., a pair of first side surfaces (34) facing away from each other and a pair of second side surfaces (40) facing away from each other. The first side surfaces (30) and the second side surfaces (40) generally have a rectangular shape. A through hole (400) is formed so as to penetrate through the first side surfaces (30).

Figure 4:
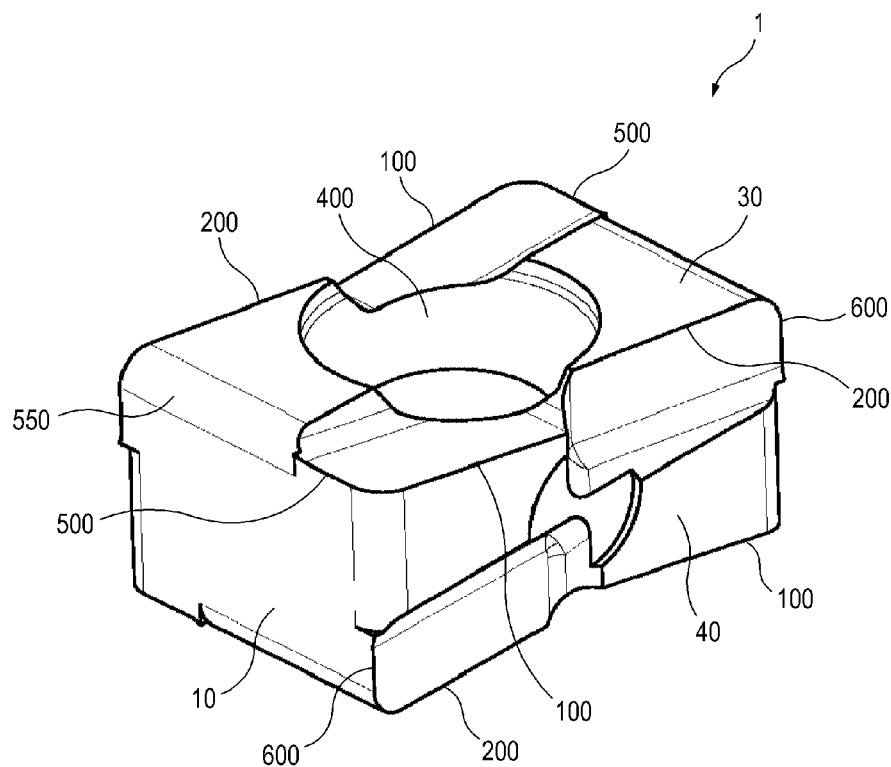
FIG. 4 illustrates a perspective view of a double-sided cutting insert according to one embodiment of the present invention.
Figure 5:
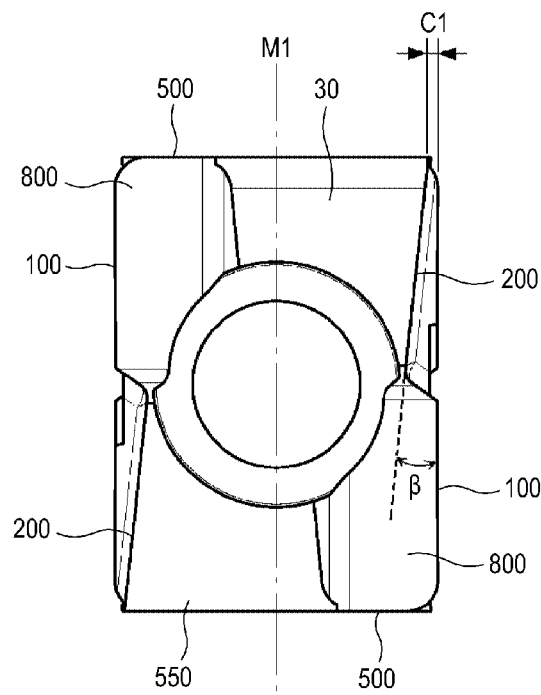
FIG. 5 illustrates a double-sided cutting insert according to one embodiment of the present invention viewed from a first side surface.
Figure 6:
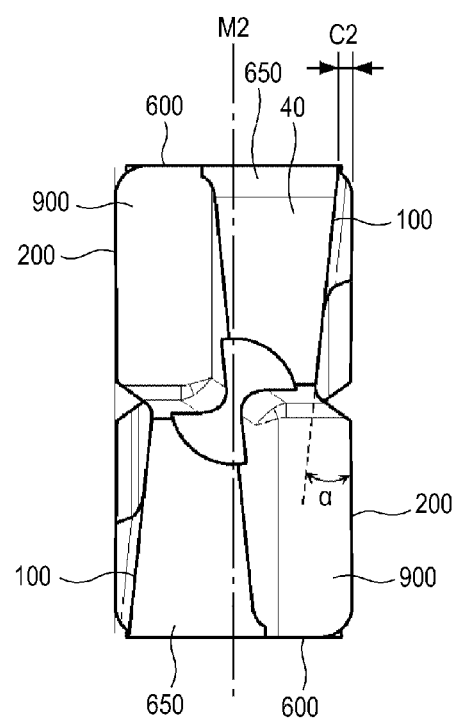
FIG. 6 illustrates a double-sided cutting insert according to one embodiment of the present invention viewed from a second side surface.

A first cutting edge (100) and a second cutting edge (200) are formed by the intersection of each first side surface (300) and second side surface (40). A first wiper edge (500) is formed by the intersection of the first side surface (30) and the end surface (10). A second wiper edge (600) is formed by the intersection of the second side surface (400) and the end surface (10). The first cutting edge (100) and the first wiper edge (500) are disposed in a pair of opposite corners of the first side surface (30). The second cutting edge (200) and the second wiper edge (600) are disposed in a pair of opposite corners of the second side surface (40). As shown in FIGS. 4 and 5, at the corner former in the first side surface (30) by the first wiper edge (500) and the first cutting edge (100), a first rake surface (800) is formed to be lower than the first side surface (30). Also, as shown in FIGS. 4 and 6, at the corner formed in the second side surface (40) by the second wiper edge (600) and the second cutting edge (200), a second rake surface (900) is formed to be lower than the second side surface (40). Then, when performing cutting of the cutting insert (1), cutting resistance becomes lower and chips can be more easily discharged.

FIG. 5 shows a double-sided cutting insert according to one embodiment of the present invention when viewed from the first side surface (30). The first side surface (30) is a diagonally-symmetrical structure with respect to a median plane (M1). The half of the long side of the first side surface (30) constitutes the first cutting edge (100) while the other half thereof constitutes the second cutting edge (200). Further, when viewed from the first side surface (30), the second cutting edge (200) is inwardly offset from the first cutting edge (100) by a gap (C1) toward the median plane (M1). Also, the second cutting edge (200) obliquely extends from the corner toward the median plane (M1) at a predetermined angle (β), which is preferably between 5° and 10°. A rounding process is performed to any portions (550) formed by the intersection of the first side surface (30) with the end surface (10), except the first wiper edge (500).

FIG. 6 shows a double-sided cutting insert according to one embodiment of the present invention when viewed from the second side surface (40). The second side surface (40) is a diagonally-symmetrical structure with respect to a median plane (M2). The half of the long side of the second side surface (40) constitutes the first cutting edge (100) while the other half thereof constitutes the second cutting edge (200). Further, when viewed from the second side surface (40), the first cutting edge (100) is inwardly offset from the second cutting edge (200) by a gap (C2) toward the median plane (M2). Also, the first cutting edge (100) obliquely extends from the corner toward the median plane (M2) at a predetermined angle (α), which is preferably between 5° and 10°. A rounding process is performed to any portions (650) formed by the intersection of the second side surface (40) with the end surface (10), except the second wiper edge (600).

Figure 7:
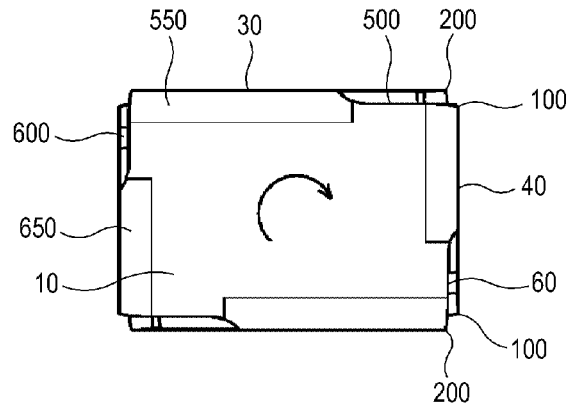
FIG. 7 illustrates a double-sided cutting insert according to one embodiment of the present invention viewed from an end surface.
Figure 8:
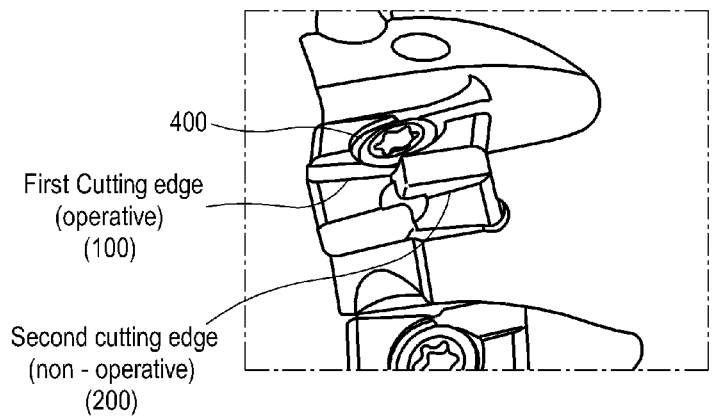
FIG. 8 illustrates a double-sided cutting insert radially mounted on a milling cutter according to one embodiment of the present invention.
Figure 9:
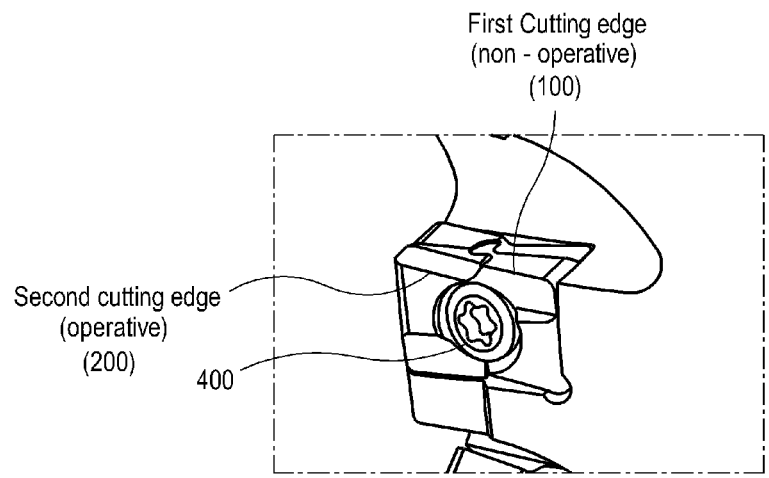
FIG. 9 illustrates a double-sided cutting insert tangentially mounted on a milling cutter according to one embodiment of the present invention.

According to the present invention, the double-sided cutting insert (1) can be mounted in two positions. That is, a user can rotate the double-sided cutting insert (1) in the arrow headed direction as shown in FIG. 7 for a radial mounting or tangential mounting. In the "radial mounting," the through hole (400) of the double-sided cutting insert (1) is mounted in a pocket portion of a milling cutter of the cutting insert (1) so that the through hole (400) may face a vertical direction with respect to the radial direction of the milling cutter (see FIG. 8). In this case, as will be explained later, the first cutting edge (100) serves as an operative cutting edge. Also, in the "tangential mounting," the double-sided cutting insert (1) is mounted in the pocket portion of the milling cutter of the cutting insert (1) so that the through hole (400) may face the radial direction of the milling cutter (see FIG. 9). In this case, as will be explained later, the second cutting edge (200) serves as an operative cutting edge.

The cutting insert (1) of the present invention is installed in an insert pocket of a milling cutter at a negative axial relief angle and a negative radial relief angle. When the cutting insert (1) is radially mounted, as described above, since the first cutting edge (100) obliquely extends from the corner toward the medial plane (M2), the operative first cutting edge (100) is disposed at a positive axial rake angle with respect to a work-piece. Also, a wiper clearance is secured at the rounding-processed portion (550).

Figure 10:
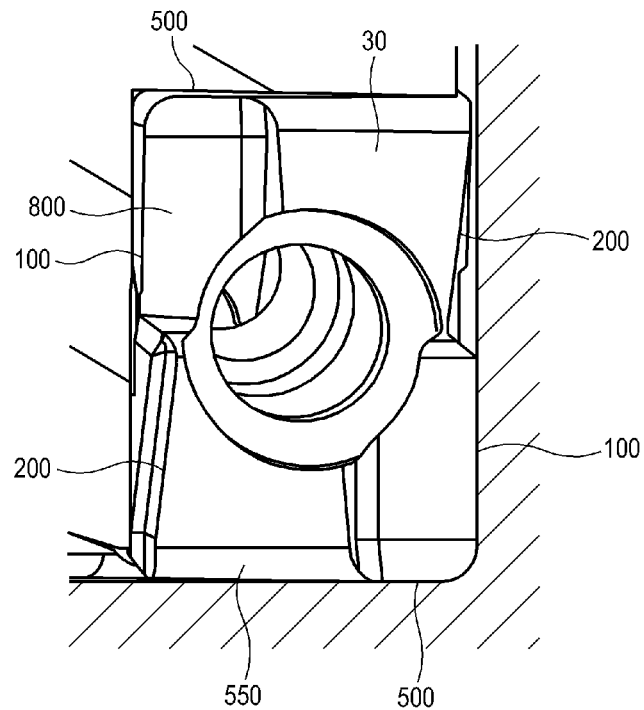
FIG. 10 shows cutting of a work-piece by the double-sided cutting insert as shown in FIG. 8.

As described above, the non-operative second cutting edge (200) is radially and inwardly offset from the operative first cutting edge (100). As such, at the mounting position as shown in FIG. 10, the non-operative second cutting edge (200) does not protrude in a radial direction of the milling cutter compared to the operative first cutting edge (100), thereby maintaining a gap with the work-piece. Thus, the cutting insert (1) of the present invention, upon radial mounting thereof, can perform the 90° shoulder milling at a cutting depth exceeding the cutting insert length.

Also, when the cutting insert (1) is tangentially mounted, as described above, since the second cutting edge (200) obliquely extends from the corner toward the median plane (M1), the operative second cutting edge (200) is disposed at a positive axial rake angle with respect to the work-piece. Thus, a wiper clearance is secured at the rounding-processed portion (650).

Figure 11:
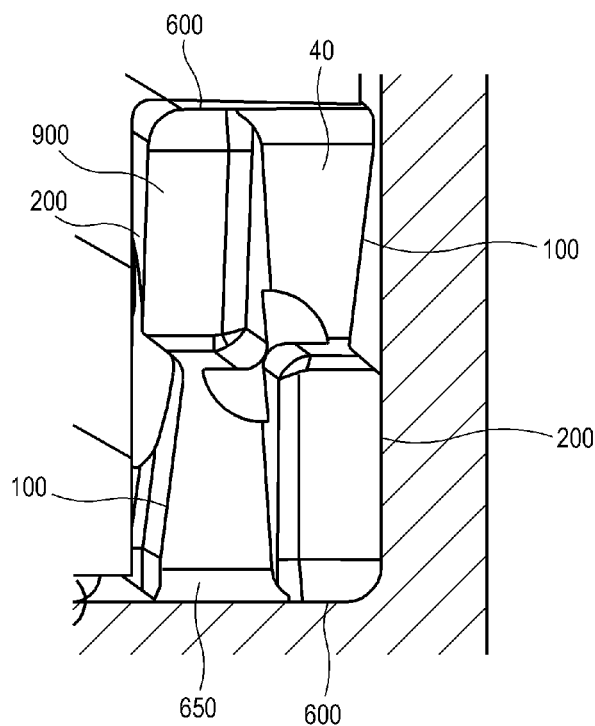
FIG. 11 shows cutting of a work-piece by the double-sided cutting insert as shown in FIG. 9.
Figure 12:
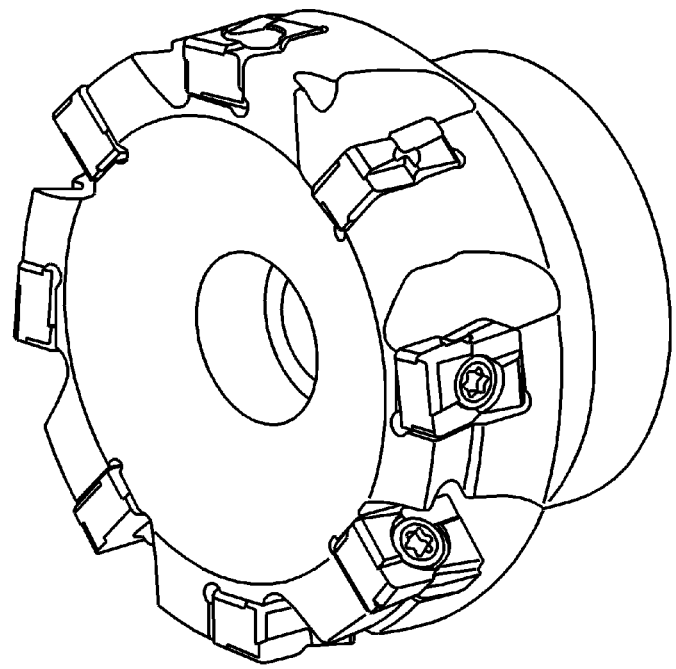
FIG. 12 illustrates a double-sided cutting insert radially and tangentially mounted on a milling cutter according to one embodiment of the present invention.
Figure 13:
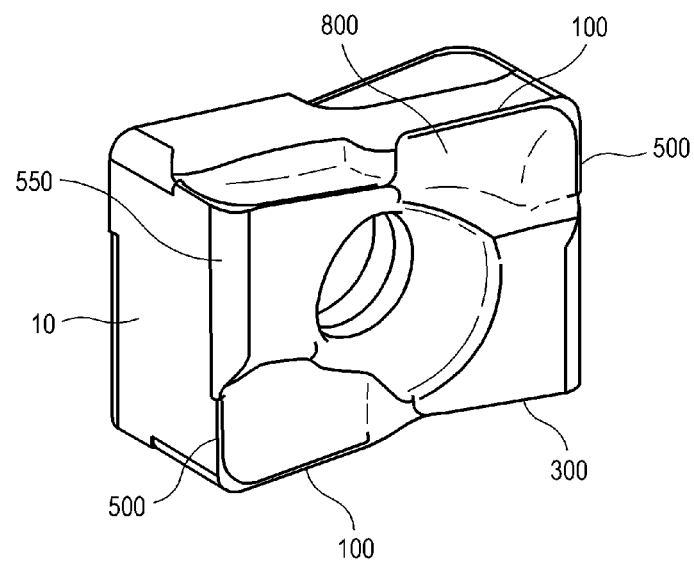
FIG. 13 illustrates a perspective view of a double-sided cutting insert according to another embodiment of the present invention.
Figure 14:
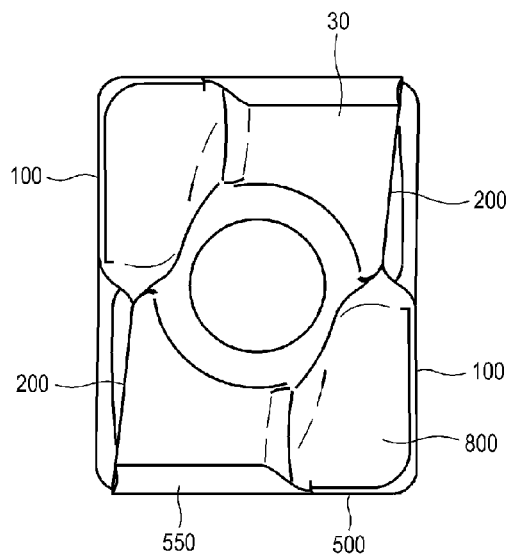
FIG. 14 illustrates a double-sided cutting insert according to another embodiment of the present invention viewed from a first side surface.
Figure 15:
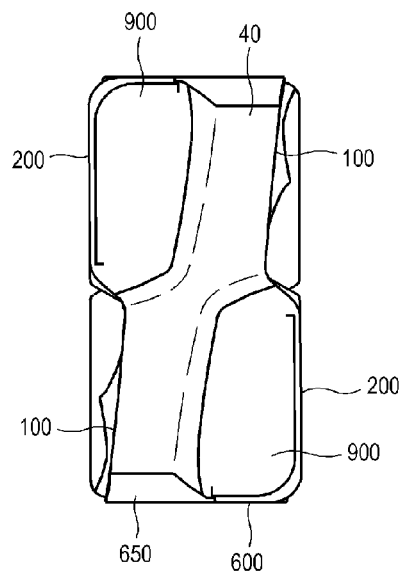
FIG. 15 illustrates a double-sided cutting insert according to another embodiment of the present invention viewed from a second side surface.
Figure 16:
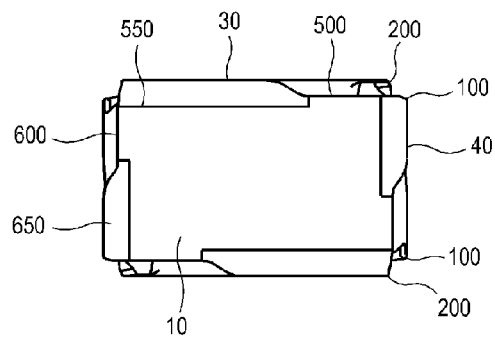
FIG. 16 illustrates a double-sided cutting insert according to another embodiment of the present invention viewed from an end surface.

In this case, since the non-operative first cutting edge (100) is radially and inwardly offset from the operative second cutting edge (200), at the mounting position as shown in FIG. 11, the non-operative first cutting edge (100) does not protrude in a radial direction of the milling cutter compared to the operative second cutting edge (200), thereby maintaining a gap with the work-piece. Accordingly, the cutting insert (1) of the present invention, upon tangential mounting thereof, can perform the 90° shoulder milling at a cutting depth exceeding the cutting insert length.

As such, according to the present invention, the cutting insert (1) can perform the 90° shoulder milling with four first cutting edges (100) and four second cutting edges (200) at its mounting positions. That is, the cutting insert (1) of the present invention is provided with a total of eight cutting edges.

Further, due to the unique shape of the cutting insert (1), the cutting insert (1) can be radially mounted as well as tangentially mounted to a milling cutter.

FIGS. 13-16 illustrate a double-sided cutting insert (1') according to another embodiment of the present invention. As shown in FIGS. 13-16, in the cutting insert (1'), a first cutting edge (100) and a second cutting edge (200) are smoothly connected with a curve. Also, to facilitate the discharge of chips, a rake surface (800, 900) and a side surface (30, 40) are smoothly connected with a curved surface. Except for said constitution, the cutting insert (1') as shown in FIGS. 13-16 is identical to the cutting insert (1) as shown in FIGS. 4-12.

It would be apparent to a person skilled in the pertinent art that the present invention is not limited to the embodiments as explained above and the drawings as attached hereto, but can be replaced, altered and modified within the scope of the technical idea of the present invention.

The invention claimed is:
1. A double-sided cutting insert, comprising:
a pair of end surfaces (10) facing away from each other; and
a pair of first side surfaces (30) and a pair of second side surfaces (40) connecting the end surfaces (10), members of each pair facing away from each other;
wherein a first cutting edge (100) and a second cutting edge (200) are formed by the intersection of each first side surface (30) and second side surface (40),
wherein the first cutting edges (100) and the second cutting edges (200) in the first side surface (30) are diagonally symmetrical with respect to a first imaginary median plane (M1) which transverses the middles of both the first side surfaces (30),
wherein the first cutting edges (100) and the second cutting edges (200) in the second side surface (40) are diagonally symmetrical with respect to a second imaginary median plane (M2), which transverses the middles of both the second side surfaces (40),
wherein the second cutting edge (200) is offset toward the first median plane (M1) from the first cutting edge (100) and obliquely extends from a corner of the cutting insert toward the first median plane (M1), and
wherein the first cutting edge (100) is offset toward the second median plane (M2) from the second cutting edge (200) and obliquely extends from the corner of the cutting insert toward the second median plane (M2).

2. The double-sided cutting insert of claim 1,
wherein a first wiper edge (500) is formed by the intersection of the first side surface (30) and the end surface (10) such that the first cutting edge (100) and the first wiper edge (500) are disposed in a pair of opposite corners of the first side surface (30), and
wherein a second wiper edge (600) is formed by the intersection of the second side surface (40) and the end surface (10) such that the second cutting edge (200) and the second wiper edge (600) are disposed in a pair of opposite corners of the second side surface (30).

3. The double-sided cutting insert of claim 2, wherein intersections of the first side surface (30) and the second side surface (40) with the end surface (10), except at the first wiper edge (500) and the second wiper edge (600), are provided with rounding-processed portions (550, 650).

4. The double-sided cutting insert of claim 1, wherein an inclination angle of the first cutting edge (100) and an inclination angle of the second cutting edge (200) are both between 5° and 10°.

5. The double-sided cutting insert of claim 2, wherein:
a first rake surface (800) is formed to be lower than the first side surface (30), at each of the opposite corners of the first side surface (30);
a second rake surface (900) is formed to be lower than the second side surface (40), at each of the opposite corners of the second side surface (40).

6. The double-sided cutting insert of claim 1, wherein the first cutting edge (100) and the second cutting edge (200) are smoothly connected to each other with a curve.

7. The double-sided cutting insert of claim 1, wherein the cutting insert can be radially mounted as well as tangentially mounted.

8. The double-sided cutting insert of claim 1, comprising a through hole (400) formed so as to penetrate through the first side surfaces (30).

9. The double-sided cutting insert of claim 1, comprising four first cutting edges (100) and four second cutting edges (200).

10. The double-sided cutting insert of claim 2, comprising four first cutting edges (100), four second cutting edges (200), four first wiper edges (500) and four second wiper edges (600).

11. A milling cutter having a plurality of double-sided cutting inserts in accordance with claim 1 mounted therein.

12. The milling cutter according to claim 11, wherein some of the plurality of cutting inserts are radially mounted in the milling cutter, and others of the plurality of cutting inserts are tangentially mounted in the milling cutter.

* * * * *